(No Model.)
A. McDONALD.
RATTAN SCRAPING MACHINE.
No. 314,042. Patented Mar. 17, 1885.
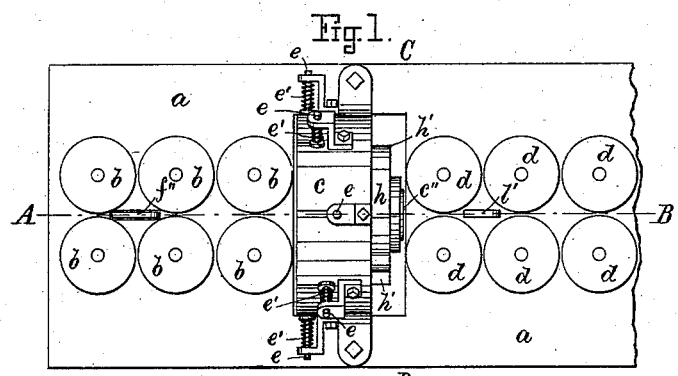
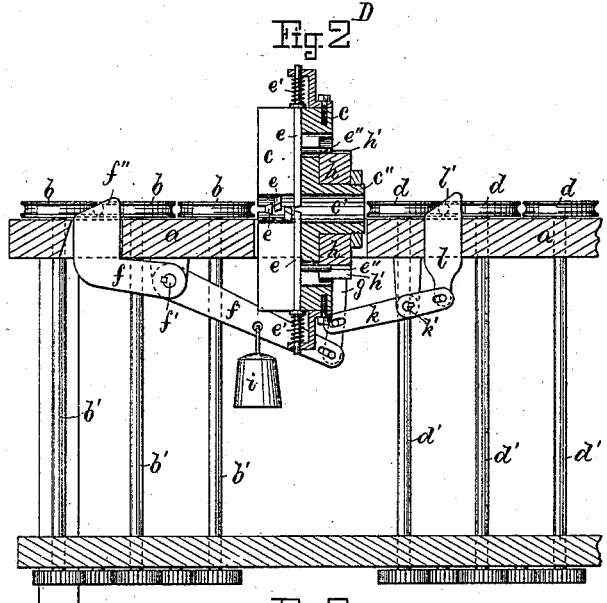
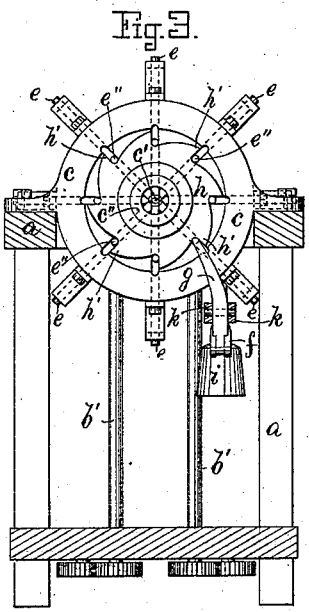
Witnesses
Henry Chadbourn.
Sarah M. Goodrich.
Inventor
Alexander McDonald
by Alban Andrew
his atty.

UNITED STATES PATENT OFFICE.

ALEXANDER McDONALD, OF WORCESTER, MASSACHUSETTS.

RATTAN-SCRAPING MACHINE.

SPECIFICATION forming part of Letters Patent No. 314,042, dated March 17, 1885.

Application filed July 17, 1884. (No model.)

*To all whom it may concern:*

Be it known that I, ALEXANDER McDONALD, a citizen of the United States, residing at Worcester, in the county of Worcester and State of Massachusetts, have invented certain new and useful Improvements in Rattan-Scraping Machines; and I do hereby declare that the same are fully described in the following specification and illustrated in the accompanying drawings.

This invention relates to improvements in rattan-scraping machines, and it is carried out as follows, reference being had to the accompanying drawings, on which—

Figure 1 represents a plan view. Fig. 2 represents a longitudinal section on the line A B, shown in Fig. 1, and Fig. 3 represents a cross-section on the line C D, also shown in Fig. 1.

Similar letters refer to similar parts wherever they occur on the different parts of the drawings.

In rattan-scraping machines heretofore made the radially-adjustable scrapers have been operated by hand by means of a suitable lever to expand the said scrapers preparatory to inserting the end of the rattan into the scraper chuck or head. This is an objectionable feature in such machines, as it requires the constant attendance of the operator to arrange and adjust the scrapers before feeding a piece of rattan into the chuck. This objection I have overcome by making an automatic device for expanding the scrapers preparatory to the rattan entering the chuck or head, and to automatically close the said scrapers onto the rattan after the forward end of it has passed through the chuck or head, or while it remains in the same, such automatic device for expanding and closing the scrapers being carried out as follows:

*a* is the usual table on a rattan-scraping machine, and *b b* are the grooved rotary feed-rolls for the rattan, by means of which it is fed as usual to the stationary chuck or scraper-head *c*.

*d d* are grooved rotary carrying or feed rolls back of the chuck *c*, as usual, for feeding the rattan to the ordinary splitting-machine after being scraped.

The rolls *b b* and *d d* are set in a rotary motion by gears applied to their respective shafts *b′ b′ d′ d′*, in the usual manner.

The chuck or scraper-head *c* has, as usual, a central perforation, *c′*, and is provided with radial grooves, in which the scrapers *e e* are movable, and forced toward the center of the said chuck by means of the usual coiled springs, *e′ e′*, as shown, or by similar means.

Beneath the table *a* is arranged the lever *f*, hung on the fulcrum-pin *f′*, such lever having in its forward end an upwardly-projecting incline, *f″*, that projects up through a slotted perforation in the table *a*, between the pairs of rollers *b b*, directly beneath the rattan that is being fed forward by said rollers. The rear end of the lever *f* is jointed to a pawl, *g*, the upper end of which is made to engage into the teeth *h′ h′* on the ratchet-wheel *h*, the latter being loosely supported on and made to revolve around the hub *c″* of the stationary chuck or scraper-head *c*, as shown in Fig. 2.

To each scraper *e* is secured a rear projecting pin or arm, *e″*, which extends far enough backward to rest on the face of the ratchet-wheel *h*, as shown in Fig. 2.

When not acted upon by the rattan, the lever *f* is held in the position shown in Fig. 2 by means of the weight *i*; or a suitable spring may be used for this purpose.

Back of the chuck or head *c* is arranged another lever, *k*, hung on the fulcrum *k′*, and jointed in its inner end to the pawl *g*, and in its outer end it is hinged to a bar or link, *l*, which projects upward through a slotted perforation in the table *a*, and has an incline, *l′*, in its upper end, as shown. Said incline *l′* is located midway between the pairs of carrying-rolls *d d* and directly in the path of the rattan that is being operated upon.

The operation of the device is as follows: As the rattan is fed forward by means of the grooved rotary feed-rolls *b b* it comes in contact with the incline *f″* of the lever *f*, which is then depressed and swung on its fulcrum, and, by its connection to pawl *g*, the latter will turn the ratchet-wheel *h* slightly around its axis, and in so doing the scrapers *e e* are automatically expanded in a radial direction sufficient to allow the end of the rattan to enter the chuck or scraper-head *c*, which is done by the action of the teeth of the ratchet-wheel $h$ on the scraper pins or projections $e'' e''$ against the influence of the springs $e' e'$. As the rattan is farther advanced its end comes in contact with the incline $l'$, causing it to be depressed, and by so doing causing the lever $k$ to act on the pawl $g$, and to turn the ratchet-wheel $h$ sufficient around its axis to permit the teeth $h' h'$ thereon to pass by the pins or projections $e'' e''$ on the scrapers $e e$, when the latter are released and automatically forced toward the center of the chuck $c$, so as to rest or close against the rattan by the influence of the springs $e' e'$, and in this manner and by these means the scrapers $e e$ are automatically expanded to allow the end of the rattan to pass into the chuck or scraper-head $c$, and automatically closed onto the rattan immediately after the forward end of the rattan passes out through the said chuck or while it remains in it, according to location of incline $l'$, as fully set forth and described.

The invention may be modified or changed as to the connecting mechanism between the operative parts without departing from the essence of my invention, which is an automatic device for expanding and closing the scrapers in the scraper-head.

I claim—

1. In a rattan-scraping machine, the chuck or scraper-head $c$, its radially-movable scrapers $e e$, combined with an automatic device for expanding said scrapers to allow the rattan to enter between them, consisting of the ratchet $h$ and pawl $g$ and connecting mechanism to the cam or projection $f''$, and also with an automatic device for closing the said scrapers onto the rattan after it has entered the chuck or scraper-head, consisting of the said ratchet $h$ and pawl $g$ and connecting mechanism to the cam or projection $l'$, as set forth.

2. In a rattan-scraping machine, the stationary scraper-head $c$ and its expansive scrapers $e e$, combined with lever $f$, jointed to pawl $g$ for operating the ratchet $h$, which is journaled on hub $c''$ of said scraper-head, the lever $f$ being provided with a tooth, cam, or projection, $f'''$, arranged in front of the scraper-head, and when actuated and depressed by the rattan while it is being fed forward causes the inclines of the teeth of the ratchet to be forced under the pins or projections $e'' e''$ on the scrapers $e e$ sufficiently to expand said scrapers before the end of the rattan reaches them, substantially as set forth.

3. In a rattan-scraping machine, the stationary scraper-head $c$ and its expansive scrapers $e e$, combined with lever $k$, jointed to pawl $g$ for operating the ratchet $h$, which is journaled on hub $c''$ of said scraper-head, the lever $k$ being hinged to link or bar $l$, which is provided with a tooth, cam, or projection, $l'$, arranged back of the scraper-head, and is actuated or depressed by the rattan while being fed forward sufficiently to cause the teeth of the ratchet $h$ to pass by the pins or projections $e''$ $e''$ on the scrapers $e e$ and the said scrapers to automatically close onto the rattan, substantially as set forth.

In testimony whereof I have affixed my signature in presence of two witnesses.

ALEXANDER McDONALD.

Witnesses:
 ALBAN ANDRÉN,
 HENRY CHADBOURN.